United States Patent [19]
Chapman et al.

[11] 3,941,755
[45] Mar. 2, 1976

[54] FIBER-FORMING 6TA/6IA COPOLYMERS

[75] Inventors: Richard D. Chapman; Donald A. Holmer; Oscar A. Pickett, Jr.; James H. Saunders, all of Pensacola, Fla.

[73] Assignee: Monsanto Company, St. Louis, Mo.

[22] Filed: Nov. 15, 1974

[21] Appl. No.: 524,165

Related U.S. Application Data

[60] Continuation-in-part of Ser. No. 378,463, July 12, 1973, abandoned, which is a division of Ser. No. 216,206, Jan. 7, 1972, abandoned.

[52] U.S. Cl...... 260/78 R; 260/30.8 R; 260/45.9 R; 260/78 S
[51] Int. Cl.² ................................ C08G 69/26
[58] Field of Search ....................... 260/78 R

[56] References Cited
UNITED STATES PATENTS

| | | | |
|---|---|---|---|
| 3,379,695 | 4/1968 | Wolfes et al. | 260/78 R |
| 3,382,216 | 5/1968 | Blaschke et al. | 260/78 R |
| 3,454,536 | 7/1969 | Schade et al. | 260/78 R |
| 3,475,387 | 10/1969 | Carter et al. | 260/78 R |
| 3,839,296 | 10/1974 | Campbell | 260/78 R |

OTHER PUBLICATIONS

Moncrief – Man Made Fibers, 1959, pp. 52–53.

Moncrief – Man Made Fibers, pp. 62–66 (1959).

*Primary Examiner*—Harold D. Anderson
*Attorney, Agent, or Firm*—John W. Whisler

[57] ABSTRACT

Copolymers made from hexamethylenediamine and a mixture of tere- and isophthalic acids in which the mixture contains between about 60 and 80 mole percent terephthalic acid are described as well as useful fibers prepared therefrom.

4 Claims, No Drawings

FIBER-FORMING 6TA/6IA COPOLYMERS

CROSS REFERENCE TO RELATED APPLICATIONS

This application is a continuation-in-part of applicants' copending application Ser. No. 378,463, filed July 12, 1973, now abandoned, which in turn is a divisional of application Ser. No. 216,206, filed Jan. 7, 1972, now abandoned.

BACKGROUND OF THE INVENTION

1. Field of the Invention

This invention relates to fiber-forming copolymers consisting essentially of recurring units of the formulas

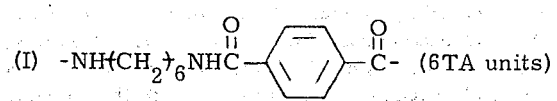

and

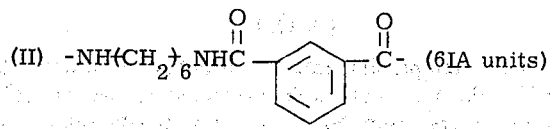

in which the mole ratio of 6TA to 6IA units is between 60:40 to 80:20. The invention also relates to useful fiber prepared from these copolymers.

2. Description of the Prior Art

Copolymers consisting of 6TA and 6IA units in which at least 50 mole percent of the units are 6IA units are taught in the prior art, for example in U.S. Pat. Nos. 3,379,695; 3,382,216; 3,454,536 and 3,475,387. While useful coatings and molded articles may be made from these prior art copolymers, fiber prepared therefrom lacks necessary dimensional stability for most fiber end use applications, that is, the fiber has high boiling water shrinkages values, i.e. values in excess of 35%.

SUMMARY OF THE INVENTION

The present invention provides copolymers consisting essentially of 6TA and 6IA units in which the mole ratio of 6TA to 6IA units is between about 60:40 and about 80:20 and preferably between 65:35 and 75:25. Surprisingly, fiber made from these copolymers has boiling water shrinkage values of less than 30%, for example, between 10 and 30% and, thus, has adequate dimensional stability for end use applications, such as in apparel and carpet applications.

DESCRIPTION OF THE PREFERRED EMBODIMENTS

The 6TA/6IA copolymers of the invention may be prepared by melt polymerization procedures where an aqueous solution of appropriate amounts of a mixture of hexamethylene diammonium terepthalate (designated herein as 6TA salt) and hexamethylene diammonium isophthalate (designated herein as 6IA salt) is heated in a conventional manner under conditions of controlled time, temperature and pressure. Preferably, the polymerization is conducted in three cycles. During the first cycle the reaction mixture is heated from room temperature to about 220°C. while under pressure of about 250 psig. During the second cycle the reaction mixture is heated to about 300°C. or higher, for example 310°C., while holding the pressure substantially constant. During the third cycle the temperature is increased slightly, for example, 10° to 20°C. while the pressure is reduced to atmospheric pressure. Optionally, after completion of the third cycle the resulting molten mass is held at atmospheric pressure at or above the melting temperature thereof for a period of time sufficient to bring it to equilibrium, for example, 30 minutes. The optimum time, temperatures and pressures involved in conducting each of the polymerization cycles will vary somewhat depending on the melting point of the particular 6TA/6IA copolymer being prepared.

In preparing the 6TA/6IA copolymers of the present invention in the manner just described there is a tendency for the polymerization product to phase-out, that is, to form a two phase system, a solid phase and a liquid, from which useful fiber cannot be melt spun. Under certain circumstances phase-out may even result in complete solidification of the polymerization mass. In general, phase-out does not occur unless the mole percentage of 6TA of the salt mixture is about 60% or higher and the tendency for phase-out to occur increases as the percentage of 6TA of a mixture increases from 60%.

Phase-out may be prevented without adversely affecting the properties and quality of the resulting 6TA/6IA copolymer or fiber made therefrom by controlling the intrinsic viscosity $[\eta]$ of the copolymer during polymerization to a value about 0.7 to 1.1. This may be accomplished by one of several polymerization procedures. One procedure (referred to herein as Procedure A) consists of conducting the melt polymerization in the presence of a small, but effective, amount of a heat stabilizer, using 6TA and 6IA salts having a pH of 7.2 ± 0.2 and, if necessary, also conducting the polymerization in the presence of a plasticizer. Another procedure (referred to herein as Procedure B) consists of using 6TA and 6IA salts having a pH of 7.2 ± 0.2 and carefully controlling the time taken to accomplish the second cycle of the polymerization to 35 ± 5 minutes and, if necessary, conducting the polymerization in the process of a plasticizer. Normally, the use of a plasticizer with Procedure A or B is necessary to prevent phase-out only when the 6TA/6IA salt mixture consists of about 70 mole percent or more of 6TA salt.

Preferred heat stabilizers for use in Procedure A include, but are not limited to, sterically hindered phenols, such as 4,4'-dihydroxy-3,3',5,5'-tetra-t-butylbenzylether and 4-hydroxymethyl-2,6-di-t-butylphenol. Generally, from 0.05 to 1% by weight, based on the weight of salts, is effective in preventing polymer phase-out when using Procedure A. The presence of the stabilizer during polymerization does not have a noticeable affect on the tensile properties or boiling water shrinkage values resulting 6TA/6IA copolymer, yet its presence does provide for a whiter fiber of enhanced heat stability. Thus, if desired, a heat stabilizer may also be used with Procedure B.

A particularly preferred plasticizer that may be used in carrying out either Procedure A or B is Santicizer-8 which is supplied by Monsanto Company and is a mixture consisting of 40% by weight of N-ethyl-o-toluene sulfonamide and 60% by weight of N-ethyl-p-toluene sulfonamide. Instead of or in addition to Santicizer-8 any other suitable plasticizers or mixture thereof may be used. Generally, from 5 to 25%, based on the weight of 6TA and 6IA salts, is sufficient to prevent phase-out when using Procedure A or B to prepare any of the 6TA/6IA copolymers of the present invention. The use of a plasticizer with either Procedure A or B has little affect, if any, on the properties of fiber made from the resulting 6Ia/6IA copolymer since most of the plasticizer is removed by vaporization from the copolymer during polymerization and processing thereof into fiber. Thus, if desired, a plasticizer may be used in preparing any of the copolymers of the invention even though it presence is not required to prevent phase-out during polymerization, for example, in preparing 6TA/6IA copolymers wherein the mole ration of 6TA to 6IA is between 60:40 and 70:30.

Preferably, the 6TA and 6IA salts used in conducting the polymerization should be of the highest possible purity. The presences of even trace amounts of impurities in the salts may be detrimental to the quality of the resulting copolymer and fiber made therefrom. For example, the presence of 10 ppm of carboxybenzaldehyde has been found to apparently catalyzes formation of bishexamethylenetriamine and other materials such as ammonia and hexamethylenimine. Bishexamethylenetriamine can cause branching and eventual cross-linking of the resulting copolymer. Under these circumstances, the copolymer may not process easily, if at all, into useful fiber or fiber processed therefrom may be discolored and/or of non-uniform denier and low quality.

Following the melt polymerization cycles the resulting molten mass may be directly melt spun into fiber or it may be extruded and made into flake that may subsequently be melted and extruded into fiber. Preferably, when melt spinning is conducted using flake, the flake is first dried, for example, in a vacuum oven for 12 hours at 70° to 80°C., to enhance its extrusion characteristics.

The copolymer of the invention may be melt spun into fiber by conventional techniques. The resulting fiber may be then drawn to a desired denier.

MEASUREMENTS AND TESTS

Intrinsic viscosity ($[\eta]$) is defined by the following equation:

$$[\eta] = \frac{\sqrt{2}}{C} \times \sqrt{N_{rel} - 1 - \ln N_{rel}}$$

where C is the polymer concentration of a solution consisting of 0.5 gram of the polymer per 100 ml of concentrated sulfuric acid and $N_{rel}$ is the relative viscosity determined by dividing the flow time in a capillary viscometer of this solution by the flow time of pure solvent. The flow times are determined at 25°C., using concentrated sulfuric acid (95-98%) as solvent, unless otherwise specified.

Boiling water shrinkage (BWS) is defined by the following equation:

$$\% \text{ BWS} = \frac{L - L'}{L} \times 100$$

where L and L', respectively, is the length of a drawn yarn before and after submerging it in boiling water for a period of 10 minutes.

Tenacity (T), expressed in grams per denier (gpd) elongation-to-break (E) expressed as a percentage of its unelongated length and initial modulus (Mi) expressed in gpd are obtained on an Instron tester (Instron Engineering Corp., Canton, Mass.) providing a constant rate of extension of 60% per minute, with a gauge length of 25 cm being used unless otherwise specified. The measured denier of the yarn and test conditions are fed to a computer before the start of the test. The computer records the load-elongation curve of the yarn sample until it is broken, calculates the T, E and Mi of the sample from the curve and fed information and provides a printout sheet with the calculated T, E and Mi values recorded thereon.

The following nonlimitive examples are given to further illustrate the invention.

Unless otherwise expressed, parts and percentages given in the examples are on a weight basis.

EXAMPLE 1

This example illustrates the preparation of 6TA and 6IA salts that were used in preparing the 6TA/6IA copolymers described in the following examples.

6TA Salt

Terephthalic acid (9137 g.) was slurried with 22 liters of deionized water in a stainless steel vessel equipped with a steam coil and a heavy duty, high speed stirrer. Then, 7700 g. of 83% hexamethylenediamine aqueous solution was added very rapidly with stirring and the mixture was heated (90°–95°C.) until a clear solution resulted. Next, the pH of the solution was adjusted to 7.20 ± 0.10. Ion exchange resin (100 g. of Amberlite IR-120 supplied by Mallinckrodt Company) was added to the hot, stirred salt solution. The resulting mixture was stirred for 20 minutes and then filtered into a stainless steel vessel. The filtrate was stirred at high speed and allowed to cool slowly to room temperature. The resulting crystallized 6TA salt was collected on a filter and dried in a vacuum oven at 80°C. to a moisture level of less than 0.5%. The dry 6Ia salt was recrystallized from 15 liters of deionized water. The resulting 6TA salt, after drying had a pH of 7.10 ± 0.10 (measured on a 10% aqueous solution) and a moisture level of less than 0.10%.

6IA Salt

Isophthalic acid (14,120 g.) was slurried in 14 liters of deionized water using the above apparatus. Then, 11,900 g. of 83% hexamethylenidiamine aqueous solution was added as above to provide a hot solution having a pH of 7.20 ± 0.20. The hot solution was filtered into a stainless steel vessel and the resulting filtrate was stirred at a high speed and allowed to cool to room temperature. The resulting crystallized 6IA salt was collected and dried in a vacuum oven at 80°C. to a moisture level of 0.5% or less. Then, 14,400 g. of the dried 6IA salt was recrystallized from 9.6 liters of deionized water and dried. The resulting dried salt had a pH of 7.20 ± 0.20 (measured on a 10% aqueous solution) and a moisture level of less than 0.10%.

EXAMPLE 2

This example illustrates the preparation of a fiber of 6TA/6IA copolymer having a mole ratio of 6TA to 6IA of 60:40 using Procedure A, wherein 4,4'-dihydroxy-3,3',5,5'-tetra-t-butylbenzylether was employed as a heat stabilizer.

90 parts of 6TA salt and 60 parts of 6IA salt together with 100 parts of deionized water, and 0.26 parts 4,4'-dihydroxy-3,3',5,5'-tetra-tertbutylbenzylether were charged to a stainless steel, high pressure autoclave. The autoclave was purged of air by use of purified nitrogen. While under a nitrogen pressure of 250 psig, the autoclave ingredients were slowly heated until a temperature of 302°C. was reached during which time steam condensate was removed and the ingredients were continuously agitated by means of a wall-scraping blade contained within the autoclave. At this point (302°C.) the autoclave pressure was gradually reduced over a 25-minute period to atmospheric pressure while allowing the melt temperature to rise and level out at 316°C. When atmospheric pressure was reached, the polymer melt was then allowed to equilibrate for 30 minutes at 316°C. The finished polymer was then extruded from the autoclave, cooled and ground. Intrinsic viscosity of the polymer was 0.86.

The ground polymer was melted in a three-fourths inch screw extruder. The resulting molten polymer was pumped through a single orifice heated spinneret (315°C.) to provide a filament that was collected. The filament was then drawn 4.15 times over a heated pin (105°C.). The resulting filament had the following properties: T/E/Mi values of 4.0 gpd/9.4%/73 gpd. In another run using the same procedure a yarn was prepared by pumping the molten polymer through a 14-hole heated (320°C.) spinneret. The resulting yarn had a BWS of 23.8%.

EXAMPLE 3

This example illustrates the preparation of yarn of 6TA/6IA copolymer having a mole ratio of 6TA to 6IA of 65:35 using Procedure A, wherein 4-hydroxymethyl-2,6-di-t-butylphenol was employed as a heat stabilizer and Stanicizer 8 as a plasticizer.

97.5 parts of 6TA salt of pH 7.00 and 52.5 parts of 6IA salt of pH 7.00 together with 100 parts of deionized water, 0.13 parts of benzenephosphonous acid (added to improve spinning performance), 0.26 parts of 4-hydroxymethyl-2,6-di-tert-butylphenol, and 5.20 parts of Santicizer-8 were charged to a stainless steel, high pressure autoclave. The autoclave was purged of air by use of purified nitrogen. While under a nitrogen pressure of 250 psig the autoclave ingredients were slowly heated until a temperature of 302°C. was reached during which time steam condensate was removed and the ingredients were continuously agitated by means of a wall-scraping blade contained within the autoclave. At this point (302°C.) the autoclave pressure was gradually reduced over a 25-minute period to atmospheric pressure while allowing the melt temperature to rise and level out at 320°C. The polymer was then extruded from the autoclave, cooled and ground. Intrinsic viscosity of the polymer was 0.75. Dry ground polymer was melted in a three-fourths-inch screw extruder. The resulting molten polymer was pumped through a 14-hole heated (320°C.) spinneret. The resulting yarn had the following properties: T/E/Mi values of 5.1 gpd/7.2%/86 gpd. In another run under the same conditions the resulting 72 denier/14 filament yarn had T/E values of 4.4 gpd/11% and a BWS of 21%. In still another run a 140-hole spinneret was used instead of a 14-hole spinneret. The resulting 890 denier yarn in this instance had T/E/Mi values of 3.5 gpd/7.0%/ 86 gpd.

EXAMPLE 4

This example illustrates the preparation of a yarn of a 6TA/6IA copolymer having a mole ratio of 6TA to 6IA of 70:30 using Procedure A, wherein 4,4'-dihydroxy-3,3',5,5'-tetra-t-butylbenzylether was employed as a heat stabilizer.

105 parts of 6TA salt of pH 7.00 and 45 parts of 6IA salt of pH 7.00 together with 100 parts of deionized water, and 0.26 parts of 4,4'-dihydroxy-3,3'5,5'-tetra-tert-butylbenzylether were charged to a stainless steel, high pressure autoclave. The autoclave was purged of air by use of purified nitrogen. The autoclave was sealed and the contents of the autoclave were heated to 264°C. while allowing the pressure to build to 600 psig. The pressure was maintained constant at 600 psig while increasing the internal temperature to 302°C. during which time steam condensate was removed and the ingredients were continuously agitated by means of a wall-scraping blade contained within the autoclave. At this point (302°C.) the autoclave pressure was gradually reduced over a period of 60 minutes to atmospheric pressure. During this pressure reduction cycle the polymer melt temperature was allowed to rise and level out at 320°C. When atmospheric pressure was reached, the polymer melt was then allowed to equilibrate for 30 minutes at 320°C. The finished polymer was then extruded directly from the autoclave, cooled in an inert atmosphere, and ground to the desired particle size for melt spinning. Intrinsic viscosity [$\eta$] of the polymer was 1.04. This polymer was melted in a three-fourths inch screw extruder and the resulting molten polymer was pumped through a 14-hole heated (320°C.) to provide a yarn that was collected and drawn as described in Example 1. The resulting yarn had a BWS of 15%.

EXAMPLE 5

This example illustration preparation of 6TA/6IA copolymer having a mole ratio of 6TA to 6IA of 65:35 using Procedure B and 70 denier/14 filament yarn spun therefrom.

6TA salt (975 g.), 6IA salt (525 g.) and deionized water (1000 g.) were charged to a stainless steel autoclave equipped with a helical band stirrer. After purging the reactor with purified nitrogen, the autoclave was sealed from the atmosphere. The contents of the autoclave were heated to 220°C. while being stirred at 18 rpm, at which point water began to distill from the system at 250 psig. The time required to complete this first cycle of the polymerization was 21 minutes. In the second cycle the pressure was maintained constant at 250 psig while the contents of the autoclave were heated to 300°C. over a 37 minute period. At this point (300°C., 250 psig) the pressure was reduced to atmospheric pressure over a period of 65 minutes while the temperature of the contents was increased to 320°C. At the end of this third cycle of the polymerization (320°C., 0 psig) the molten polymer was extruded through a one-eigth inch circular die at the bottom of the autoclave. The molten polymer was blanketed with nitrogen and rapidly quenched in water. The resulting polymer having an [η] of 0.77, melting range of 300°–310°C. (as measured by differential thermal analysis, DTA) and a density of 1.180 (as measured in a calibrated density gradient tube) was ground to a particle size of approximately 1/16 inch.

The ground polymer (1134 g.) was charged to a 3.785 liter (1 gal.) container equipped with an inert gas sweep and mounted on a rotating apparatus in an air oven. The container was then swept with nitrogen while rotating at about 65 rpm at room temperature for 15 minutes. Next, the oven was heated to 175°C. and rotation and nitrogen sweep of the container were continued for 3 hours, after which time the oven heat was turned off and the contents of the container were allowed to cool to below 100°C. The polymer was then removed from the container and dried for 8 hours in a vacuum oven at 70°–80°C. and at a pressure of 736.5 mm. of Hg. The density of the resulting polymer was about 1.21 g/cc while its melting point and [η] were unchanged. The drying of the polymer in the above manner enhances the extrusion characteristics thereof during subsequent spinning operations.

The dried polymer was heated in a screw melter to 320°C. The resulting molten polymer was passed from the screw to a metering pump and then to a spinneret assembly where the molten polymer was extruded at 320°C. through a 14-hole spinneret into yarn. The resulting yarn then passed over a finishing roll where about 2% by weight, based on the weight of the yarn, a textile finish was applied to the yarn and was collected. The yarn was then drawn over two draw pins in series (the first pin was at a temperature between 60° and 90° and the second pin was at a temperature of about 115°C.) to provide a 70 denier yarn which was collected. The resulting yarn had T/E/Mi values of 3.5/7.0/86 and a BWS of 21%.

The polymerization procedure used in this example is summarized in the following Table.

TABLE A

| Cycle | 1 | 2 | 3 |
|---|---|---|---|
| Time (min.) | 21 | 37 | 65 |
| Temperature (°C.) | RT→220 | 220→300 | 300→320 |
| Pressure (psig) | 250 | 250 | 250→0 |
| Spinning Temperature | 310°C. | | |

EXAMPLE 6

This example illustrates the preparating of 6TA/6IA copolymer having a mole ratio of 6TA to 6IA of 60:40 using Procedure B and 70 denier/14 filament yarn spun therefrom.

6TA salt (900 g), 6IA salt (600 g.) and deionized water (1000 g.) were charged to a stainless steel autoclave and polymer and yarn were prepared following the exact procedure recited in Example 5. The resulting copolymer had an [η] of 0.79 and the resuling 70 denier/14 filament yarn had T/E values of 4.0 gpd/9.0% and a BWS of 24%.

EXAMPLE 7

This example illustrates the preparation of 6TA/6IA copolymer having a 6TA to 6IA mole ratio of 70:30 using Procedure B and 100 denier/14 filament yarn spun therefrom.

6TA salt (105 g.), 6IA salt (45 g.), deionized water (100 g.), hexamethylenediamine (0.772 g. or 1.25 mole %, based on salts) and Santicizer-8 (11 mil. or 10% based on weight of polymer) were charged to a stainless steel autoclave. The polymer was prepared in the manner described in Example 5 using the following procedure:

| Cycle | 1 | 2 | 3 |
|---|---|---|---|
| Time (min.) | 32 | 33 | 25 |
| Temperature (°C.) | RT→220°C. | 220→310 | 310→316 |
| Pressure (psig) | 250 | 250 | 250→0 |

The resulting polymer had an [η] of 0.76 and was spun directly from the bottom of the autoclave through 14-hole heated (320°C.) spinneret into yarn that was drawn sufficiently to provide 110 denier yarn. The resulting yarn had T/E values of 2.5 gpd/22% and a BWS of 13%.

In preparing the above copolymer HMD was added to the salts to replace HMD which was entrained and loss when the Santicizer-8 was volatilized and removed from the polymerization mixture during the second cycle.

EXAMPLE 8

This example illustrates the preparation of 6TA/6IA copolymer ha having a 6TA to 6IA mole ratio of 75:25 using Procedure B and 124 denier/14 filament yarn spun therefrom. The polymer and yarn were prepared in the manner described in Example 7. In this instance the following ingredients were charged to the autoclave:

112.5 g. of 6TA salt
37.5 g. of 6IA salt
100 g. of deionized water
1.235 g. HMD (2 mole % based on salt)
16.5 ml. of Santicizer-8 (15 wt. % based on polymer)

and the following procedure was used:

| Cycle | 1 | 2 | 3 |
|---|---|---|---|
| Time (min.) | 29 | 34 | 34 |
| Temperature (°C.) | RT→220 | 220→315 | 315→326 |
| Pressure (psig) | 250 | 250 | 250→0 |

The resulting polymer had an [η] of 0.65 and was spun directly from the bottom of the autoclave through a 14-hole heated (322°C.) spinneret into a yarn that was drawn sufficiently to provide a 124 denier yarn. The resulting yarn had T/E values of 2.8 gpd/12% and a BWS of 10%.

The following examples illustrate the preparation of 6TA/6IA copolymer having a 6TA to 6IA mole ratio of 55:45, 50:50 and 40:60, respectively, and yarns made from these copolymers. The BWS values of these yarns when compared to the BWS values of yarns made from 6TA/6IA copolyners of the present invention are significantly higher.

COMPARATIVE EXAMPLE I

This example illustrates the preparation of 6TA/6IA copolymer having a mole ratio of 55:45 and 14 filament yarn melt spun therefrom.

The polymer and yarn were prepared in the manner described in Example 7. In this instance the following ingredients were charged to the autoclave:

82.5 g. of 6TA salt
67.5 g. of 6IA salt 100 g. of deionized water
and the following procedure was used:

| Cycle | 1 | 2 | 3 |
|---|---|---|---|
| Time (min.) | 28 | 26 | 25 |
| Temperature (°C.) | RT→220 | 220→290 | 290→310 |
| Pressure (psig) | 250 | 250 | 250→0 |

At the completion of the third cycle the molten polymer had an [η] of 0.78 and was extruded directly from the bottom of the autoclave through a 14-hole spinneret into yarn. The resulting yarn was drawn to a denier of 77. The drawn yarn had a T/E value of 3.0 gpd/7.0% and a BWS of 40%.

COMPARATIVE EXAMPLE II

This example illustrates the preparation of 6TA/6IA copolymer having a 6TA to 6IA mole ratio of 50:50 and 13 filament yarn melt spun therefrom.

The polymer and yarn were made in the same manner as described in Comparative Example I. In this instance the following ingredients were charged to the autoclave:

75 g. of 6TA salt
75 g. of 6IA salt
100 g. of deionized water
and the following procedure was used:

| Cycle | 1 | 2 | 3 |
|---|---|---|---|
| Time (min.) | 30 | 27 | 25 |
| Temperature (°C.) | RT→220 | 220→285 | 285→300 |
| Pressure (psig) | 250 | 250 | 250→0 |

The polymer had [η] of 0.86 and was melt spun from the autoclave through a 13-hole spinneret in the manner described in Comparative Example I. The resulting yarn was drawn to a denier of 74. The drawn yarn had T/E values of 3.2 gpd/19.0% and a BWS of 48%.

COMPARATIVE EXAMPLE III

This example illustrates the preparation of 6TA/6IA copolymer having a 6TA to 6IA mole ratio of 40:60 and 74 denier/13 filament yarn melt spun therefrom. The polymer and yarn were made in the same manner as described in Comparative Example II. In this instance the following ingredients were charged to the autoclave:

60 g. of 6TA salt.
90 g. of 6IA salt.
100 g. of deionized water
and the following procedure was used:

| Cycle | 1 | 2 | 3 |
|---|---|---|---|
| Time (min.) | 21 | 37 | 65 |
| Temperature (°C.) | RT→220 | 220→300 | 300→320 |
| Pressure (psig) | 250 | 250 | 250→0 |

The resulting polymer was then melt spun to provide a drawn yarn having a BWS of 67%.

In Table B the BWS values of the yarns described in the foregoing examples are summarized:

TABLE B

| Example | 6TA:6IA Mole Ratio | BWS |
|---|---|---|
| 2 | 60:40 | 23.8% |
| 3 | 65:35 | 21.0% |
| 4 | 70:30 | 15.0% |
| 5 | 65:35 |  |
| 6 | 60:40 | 24.0% |
| 7 | 70:30 | 13.0% |
| 8 | 75:25 | 10.0% |
| I | 55:45 | 40.0% |
| II | 50:50 | 48.0% |
| III | 40:60 | 67.0% |

The above examples illustrate that fiber made from the 6TA/6IA copolymers of the present invention unexpectly have low BWS values when compared to fiber made from the 6TA/6IA copolymers of the prior art.

We claim:

1. A fiber-forming copolymer consisting essentially of recurring units of the formulas:

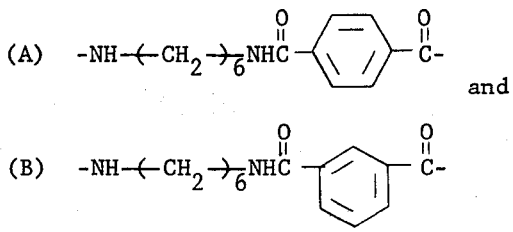

wherein the mole ratio of units A to B is between about 60:40 to about 80:20 and wherein said copolymer in fiber form has a boiling water shrinkage between 10 and 30%.

2. The copolymer of claim 1 wherein the mole ratio of units A:B is between 65:35 and 75:25.

3. The copolymer of claim 1 in the form of a filament.

4. The copolymer of claim 2 in the form of a filament.

* * * * *